(12) United States Patent
Kakapuri (10) Patent No.: US 9,104,353 B2
(45) Date of Patent: Aug. 11, 2015

(54) PRINTING OF CONFIDENTIAL DOCUMENTS

(71) Applicant: Hewlett-Packard Development Company, L.P., Houston, TX (US)

(72) Inventor: Vishal Kakapuri, Bangalore (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 13/853,045

(22) Filed: Mar. 28, 2013

(65) Prior Publication Data

US 2014/0293313 A1    Oct. 2, 2014

(51) Int. Cl.
| | |
|---|---|
| *G06K 15/00* | (2006.01) |
| *H04N 1/40* | (2006.01) |
| *G06F 3/12* | (2006.01) |
| *G06F 7/04* | (2006.01) |
| *G06F 21/60* | (2013.01) |

(52) U.S. Cl.
CPC ............ *G06F 3/1222* (2013.01); *G06F 3/1238* (2013.01); *G06F 3/1285* (2013.01); *G06F 21/608* (2013.01)

(58) Field of Classification Search
CPC ...................... G06F 21/608; H04N 2201/3233
USPC ........... 358/3.28, 1, 14, 1.15, 1.16; 726/2, 26, 726/27, 28
See application file for complete search history.

(56) References Cited

U.S. PATENT DOCUMENTS

| | | | |
|---|---|---|---|
| 7,933,031 B2 | 4/2011 | Aritomi | |
| 7,961,175 B2 | 6/2011 | Lapstun et al. | |
| 8,041,952 B2 | 10/2011 | Parry | |
| 8,245,306 B2 | 8/2012 | Gimenez | |
| 8,305,604 B2 | 11/2012 | McIntyre | |
| 8,572,758 B1 | 10/2013 | Clifford | |
| 2002/0042884 A1 | 4/2002 | Wu et al. | |
| 2005/0166052 A1* | 7/2005 | Khormaei et al. | 713/176 |
| 2007/0031046 A1* | 2/2007 | Onishi | 382/232 |
| 2011/0093768 A1 | 4/2011 | Panwar | |
| 2011/0239113 A1* | 9/2011 | Hung et al. | 715/271 |
| 2012/0206758 A1 | 8/2012 | Gibson et al. | |

OTHER PUBLICATIONS

Electronic Records Management Handbook, State and Consumer Services Agency Department of General Services, State of California Records Management Program, Feb. 2002, pp. 1-105, Published by CalRIM, DGS Calfornia Records & Information Management, Available at: <documents.dgs.ca.gov/osp/recs/ermhbkall.pdf>.

(Continued)

*Primary Examiner* — Thomas Lett
(74) *Attorney, Agent, or Firm* — Mannava & Kang, P.C.

(57) ABSTRACT

Systems and methods for printing a document over a network are described. The system may include an authentication code generation module coupled to a processor to receive a document to be printed from a user. Further, the authentication code generation module ascertains whether the document is confidential, based on a confidentiality determination criterion. On ascertaining that the document is confidential, an authentication code corresponding to the document is generated to provide print control to a predefined set of authorized users. The authentication code is provided to the predefined set of authorized users including the user.

11 Claims, 7 Drawing Sheets

(56) References Cited

OTHER PUBLICATIONS

Hewlett-Packard Development Company, L.P., "Cloud printing in the enterprise: Liberating the mobile print experience from cables, operating systems and physical boundaries," Mar. 2010, 8 pages, <http://www.hubtechnical.com/Collateral/Documents/English-US/HP/11-CloudPrintingintheEnterprise.pdf>.

Hewlett-Packard Development Company, L.P., "HP Access Control Secure Pull Printing," Nov. 2008, 2 pages, <http://h71028.www7.hp.com/enterprise/downloads/HP-Access-Control-Secure-Pull-Printing.pdf>.

Canon, "ImageWARE(TM) Secure Audit Manager," 2007, 6 pages. <http://www.usa.canon.com/CUSA/assets/app/pdf/ISG_Security/brochure_iwsam_.pdf>.

Hewlett-Packard Development Company, L.P., "HP ePrint Enterprise mobile printing solution," Mar. 2010, 2 pages, <http://www.hp.com/hpinfo/newsroom/press_kits/2010/MPSSpring2010/pdf/HP_ePrint.pdf>.

Hewlett-Packard Development Company, L.P., "HP ePrint Enterprise mobile printing solution," Sep. 2010, 2 pages, <http://www.hp.com/hpinfo/newsroom/press_kits/2010/InnovationSummit/HP_ePrint_Enterprise_Solution.pdf>.

Lexmark, "Lexmark Secure Content Monitor," 2012, 2 pages. <http://lexmark.com/common/masterbrochures/Secure-Content-Monitor.pdf>.

\* cited by examiner

PRINTING OF CONFIDENTIAL DOCUMENTS

BACKGROUND

Generally, in a shared printer environment, a plurality of computing devices is connected to at least one printer over a network. Print jobs can be assigned to the printer by a user using any of the computing devices connected to the network. Nowadays, to increase mobility, reduce costs, and simplify IT administration, cloud printing solutions are being implemented in the shared printer environments for centralized print management. In such a case, the printer receives an assigned print job from the computing devices through the cloud printing solution.

In a typical cloud printing environment, the documents to be printed may be mailed or uploaded to the cloud by one of the users. Further, such documents may be printed upon receiving a print request, through the cloud printing solution, from any one of the users connected to the printer.

BRIEF DESCRIPTION OF FIGURES

The detailed description is provided with reference to the accompanying figures. In the figures, the left-most digit(s) of a reference number identifies the figure in which the reference number first appears. The same numbers are used throughout the figures to reference like features and components.

DETAILED DESCRIPTION

The present subject matter relates to systems and methods for printing a document over a network, such as cloud printing network.

In a typical cloud printing network, printers may be connected to user devices, such as laptops, personal computers, work stations, and print servers over a network referred to as cloud. Thus, in such a network, multiple users may share a common a printer, which in turn provides benefits in terms of reduction in IT related costs. Further, in such a network, a user may remotely access the printer, thereby providing mobility to the user. For example, even though the printer may be at one geographic location, the user may provide a request for printing a document from another geographic location.

Generally, in cloud printing network, the users may electronically mail (email) the documents to be printed, or scan and upload such documents. A variety of documents, for example, confidential documents, may be provided for printing. Such documents may be stored at the cloud and may be printed in future by any one of the users connected to the cloud. Thus, in case a confidential document is stored in the cloud by one of the users, another user, who is not authorized to access such document, may print the document, thereby making cloud printing solution vulnerable to security issues. Further, oftentimes the users, due to their limited technical knowledge, may not be aware of various password protection mechanisms and tools to secure a soft copy of a document before providing it for print. Thus, it may be a tedious and complicated task for such users to ensure the confidentiality of the documents.

Systems and methods for printing confidential documents are described herein. In an example, a document may be provided by a user to a printer for printing in a shared printer environment. On receiving a print job including the document to be printed, it may be determined whether the document is confidential, based on a confidentiality determination criterion. The confidentiality determination criterion may be, for example, to detect the presence of at least one confidential code at one of predefined locations in a document. The confidential codes that may be used for determining the confidentiality may be predefined by a user. Further, the confidential codes may be handwritten or typewritten. Upon receiving the document, if it is determined that the document is confidential, an authentication code is generated to provide print control to authorized users. The print control may be understood as a control provided to a user for printing a document.

Further, a user may provide a print request for printing a document, for example, a document already stored in the shared printer environment. Upon receiving the print request, it may be determined whether the print request is for printing a confidential document. Thus, it may be determined whether the document was marked confidential based on the confidentiality determination criterion. If it is determined that the document was marked confidential, the user may be prompted to provide the authentication code. In case a valid authentication code is provided by the user, the document may be printed; else the user may not be allowed to print the document.

Thus, the access to print the documents may be provided to authorized users and an unauthorized user may not be able to print the document, thereby ensuring the confidentiality of the documents that are accessible for printing in a shared printer environment. Further, the present subject matter involves minimal user intervention, which makes it simple to implement and enhances user experience.

The above systems and methods are further described in conjunction with the following. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and embodiments of the present subject matter, as well as specific examples thereof, are intended to encompass equivalents thereof.

Figure 1A:
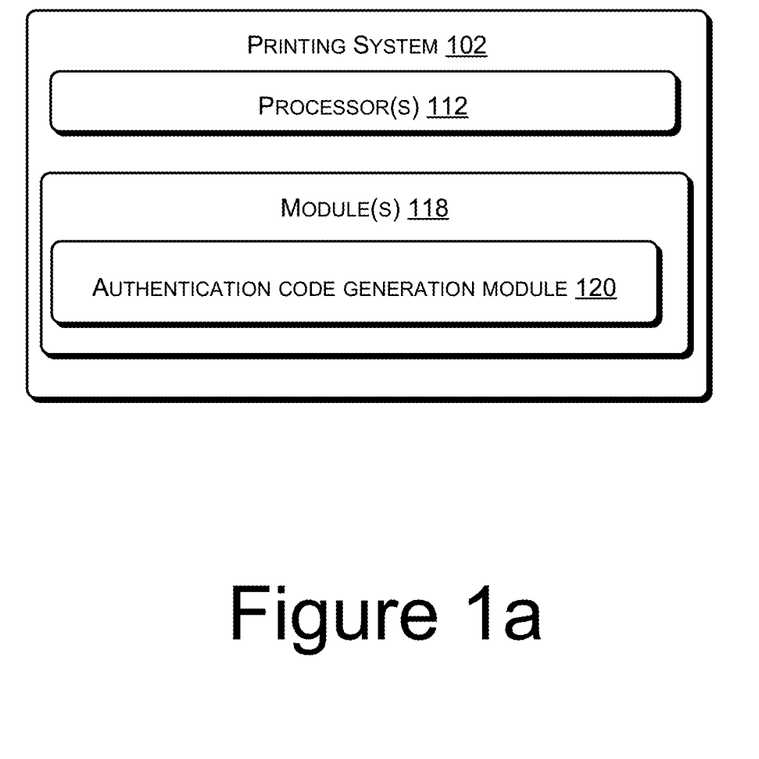
FIG. 1a schematically illustrates a printing system, according to an example of the present subject matter.

FIG. 1a schematically illustrates components of a printing system 102, according to an example of the present subject matter.

In one implementation, the printing system 102 includes a processor 112 and modules 118 communicatively coupled to the processor 112. The modules 118, amongst other things, include routines, programs, objects, components, and data structures, which perform particular tasks or implement particular abstract data types. The modules 118 may also be implemented as, signal processor(s), state machine(s), logic circuitries, and/or any other device or component that manipulate signals based on operational instructions. Further, the modules 118 can be implemented by a hardware, by computer-readable instructions executed by a processing unit, or by a combination thereof. In one implementation, the modules 118 include an authentication code generation module 120. In an example, the authentication code generation module 120 receives, from a user, a document for printing. The authentication code generation module 120 may further ascertain whether the document is confidential, based on a confidentiality determination criterion. On ascertaining that the document is confidential, an authentication code corresponding to the document may be generated. The authentication code may be generated to provide print control to a predefined set of authorized users including the user who provided the document for printing. Further, the authentication code may be to the predefined set of authorized users to provide the print control. The various components of printing system 102 are described in detail in conjunction with FIGS. 1b and 1c.

Figure 1B:
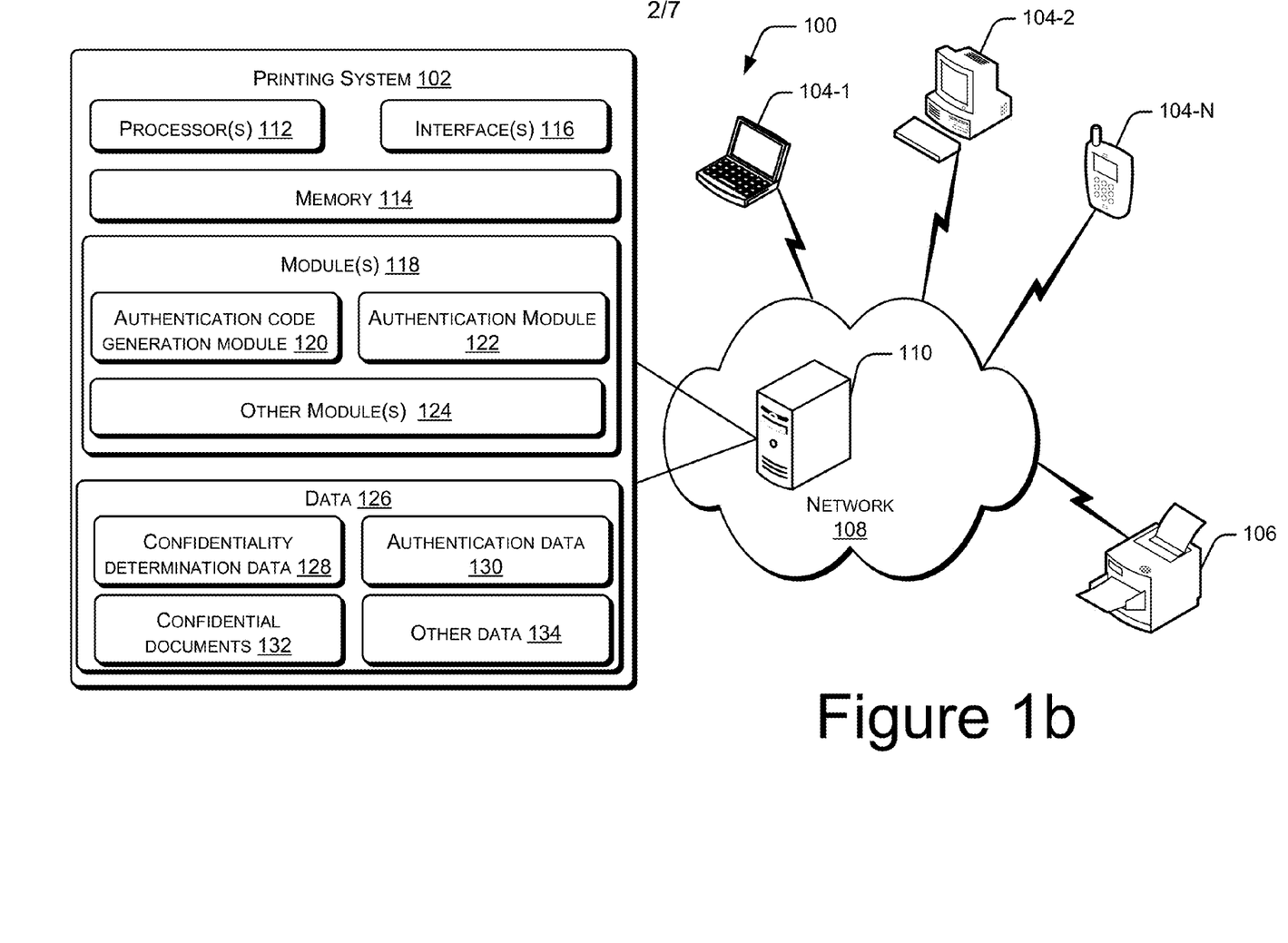
FIG. 1b illustrates a shared printer environment implementing the printing system, according to an example of the present subject matter.
Figure 1C:
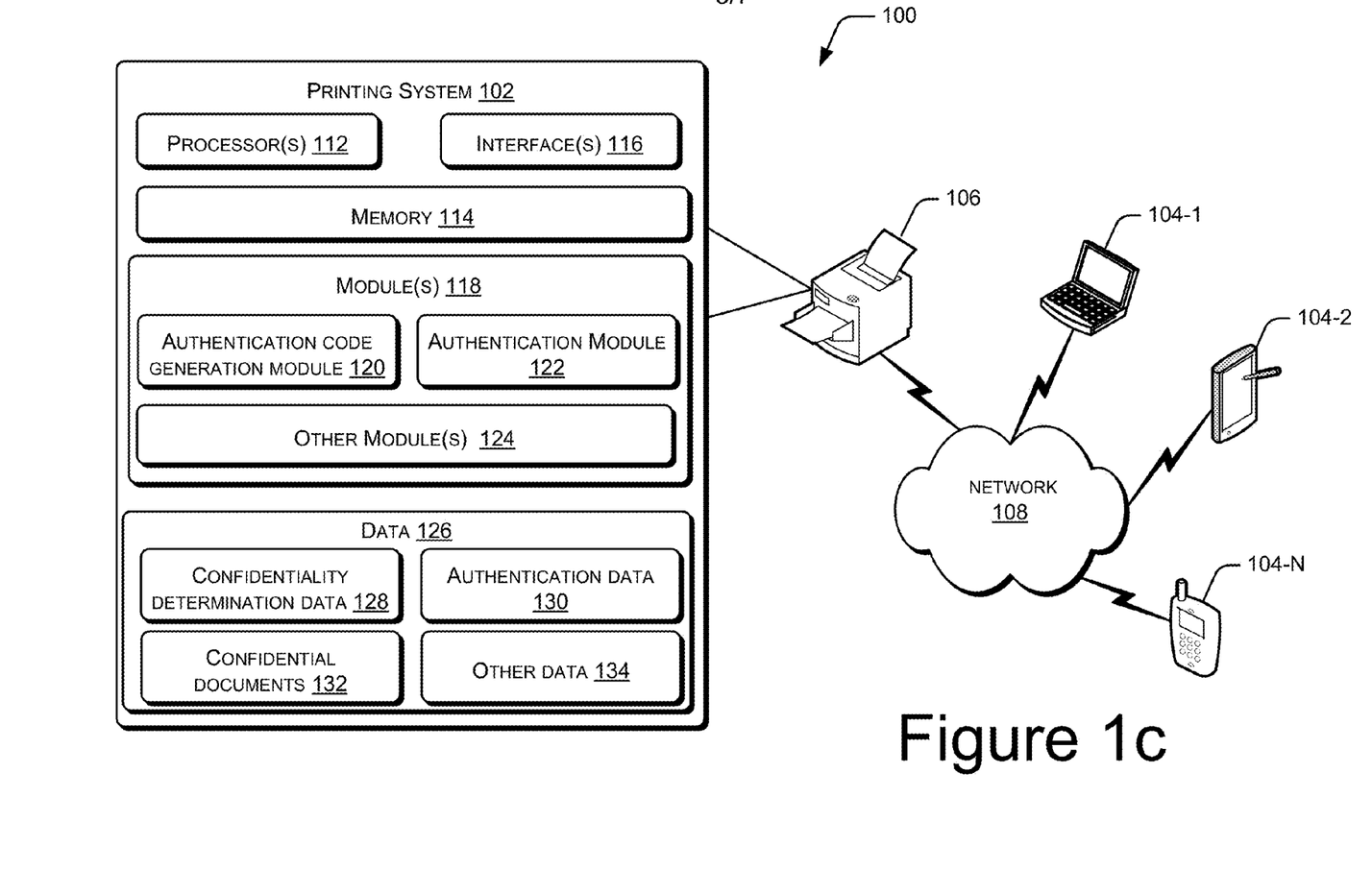
FIG. 1c illustrates the shared printer environment implementing the printing system, according to another example of the present subject matter.

FIGS. 1b and 1c illustrate a shared printer environment 100 implementing the printing system 102, according to an example of the present subject matter. The shared printer environment 100 may include, for example, an enterprise environment and a central printer network environment implemented in various institutions, such as library, universities, and hospitals. The shared printer environment 100 includes a plurality of user devices 104-1, 104-2, . . . and 104-N coupled to a printer 106 over a network 108, such as a cloud printing network.

The user devices 104-1, 104-2, . . . , 104-N, may be collectively referred to as user devices 104, and individually referred to as a user device 104, hereinafter. The user devices 104 can include, but are not restricted to, desktop computers, laptops, smart phones, personal digital assistants (PDAs), tablets, and the like. The user devices 104 may be communicatively coupled to the printing system 102 over the network 108 through one or more communication links, for example, via dial-up modem connections, cable links, and digital subscriber lines (DSL), wireless or satellite links, or any other suitable form of communication through the network 108.

The network 108 may be a wireless network, a wired network, or a combination thereof. The network 108 can also be an individual network or a collection of many such individual networks, interconnected with each other and functioning as a single large network, e.g., the Internet or an intranet. The network 108 can include different types of networks, such as intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. The network 108 may also include individual networks, such as, but not limited to, Global System for Communication (GSM) network, Universal Telecommunications System (UMTS) network, and Long Term Evolution (LTE) network. Further, it may be understood that the communication between the printing system 102, the user devices 104, and other entities may take place based on the communication protocol compatible with the network 108.

Further, the printing system 102 may be implemented in a server, a work station, a printer, and the like. For example, as illustrated in FIG. 1a, the printing system 102 may be implemented in a computing device 110 provided in the network 108. In another example, as illustrated in FIG. 1b, the printing system 102 may be implemented in the printer 106. The printing system 102 includes a processor 112, and a memory 114 connected to the processor 112.

The processor 112 may include microprocessors, microcomputers, microcontrollers, digital signal processors, central processing units, state machines, logic circuitries and/or any other devices that manipulate signals and data based on computer-readable instructions. Among other capabilities, the processor 112 may fetch and execute computer-readable instructions stored in the memory 114.

Functions of the various elements shown in the figures, including any functional blocks labeled as "processor(s)", may be provided through the use of dedicated hardware as well as hardware capable of executing computer-readable instructions.

The memory 114, communicatively coupled to the processor 112, can include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further the printing system 102 includes interfaces 116. The interfaces 116 may include a variety of commercially available interfaces, for example, interfaces for peripheral device(s), such as data input output devices, referred to as I/O devices, storage devices, network device. The interfaces 116 may facilitate multiple communications within a wide variety of networks and protocol types, including wired networks and wireless networks, for example, WLAN, cellular, and satellite-based network.

Further, the printing system 102 may include the module(s) 118. The modules 118 may be coupled to the processor 112.

In an example, the modules 118 include the authentication code generation module 120, an authentication module 122, and other module(s) 124. The other module(s) 124 may include computer-readable instructions that supplement applications or functions performed by the printing system 102.

Further, the printing system 102 may also include data 126. In one implementation, the data 126 includes confidentiality determination data 128, authentication data 130, confidential documents 132, and other data 134. The other data 134 may include data generated and saved by the modules 118 for providing various functionalities of the printing system 102.

In an implementation, the printing system 102 may receive a print job, including a document that is to be printed by a user. The user may provide the document through a corresponding user device 104 over the network 108. In an example, the user may email the document to an email id corresponding to the printer. In another example, the user may upload the document to the computing device 110 in the cloud or to the printer.

The authentication code generation module 120 may determine whether the document is confidential or not based on a confidentiality determination criterion. The confidentiality determination criterion may be to check for presence of at least one confidential code on the document. A confidential code may be understood as a label or a tag that helps indentify a document as confidential. Confidential codes may include predefined terms, such as 'confidential', 'private', 'privileged work product', and 'protected'. Further, the confidential codes may also include user defined terms, such as name of a user or a particular symbol. Additionally, the confidential code may be handwritten or typewritten in the document by way of text or an image. For example, consider a case where a user has a hard copy of the document and wishes to take multiple copies of this document. In said example, the user may mark the document as confidential by hand, i.e., the user may tag the document with one of the predefined confidential codes. Subsequently, the user may scan the document having the confidential code and provide it to the printing system 102 so that it may be accessed and printed in future. Thus, owing to the provision of having handwritten confidential codes, the users, who may have limited technical knowledge, may be assured of the confidentiality of the documents being printed in the shared printer environment 100.

In another example, if a soft copy of the document is already available with the user, the user may electronically tag the document with the confidential code. It will be understood that certain documents may inherently have a confidential code provided thereon, for example, emails shared between two users or invoices sent by an enterprise to a user. Therefore, in such a case, a user may not have to tag the document as confidential, thereby saving on time and resources.

Referring to the confidentiality determination criterion, in addition to specifying a predefined set of confidential codes, the confidentiality determination criterion may also specify a set of predetermined locations in a document where the presence of the confidential codes is to be checked. For example, the confidentiality determination criterion may be to check for presence of confidential code 'private' at the bottom of the document. In another example, the confidentiality determination criterion may be to check for presence of a user defined symbol, say, "X" at any of the four corners of the document. In yet another example, the confidentiality determination criterion may be to check for presence of a watermark. The confidentiality determination criterion may be configured by a user and may be stored in the confidentiality determination data 128.

As mentioned earlier, the authentication code generation module 120 may determine whether the document is confidential or not based on the confidentiality determination criterion. The printing system 102 may detect the presence of confidential codes using techniques, such as an optical character recognition (OCR) technique and an intelligent character recognition (ICR) technique. If it is determined that the document is not confidential, the authentication code generation module 120 may store the document for future use in the other data and follow a usual printing process. However, if it is determined that the document is confidential, the authentication code generation module 120 may mark it is as confidential and store the document in the confidential documents 132. For the sake of explanation, the confidential documents 132 have been illustrated external to other data 134, it will be understood that the confidential documents 132 may be internal to the other data 134 as well.

Further, the authentication code generation module 120 may generate an authentication code to provide selective control for printing the document. In an example, the authentication code generation module 120 may implement a random password generator to generate the authentication code. The authentication code may be a personal identification number (PIN) or a password that helps in establishing identity of a predefined set of users. The predefined set of users may include one or more users who may be authorized to print a given confidential document. The predefined set of users may be predefined by a user or an administrator. The predefined set of users may be stored in the authentication data 130. Further, the authentication data 130 may include authentication codes associated with each of the documents marked as confidential. Thus, the authentication code provides integrity and authenticity to the print control, thereby ensuring that control to print the document is provided to an authorized user(s).

Further, the generated authentication code may be provided to the predefined set of users. For example, the authentication code generation module 120 may email the authentication to an email id corresponding to the user, who had sent a request to print the document. In another example, the authentication code may be provided by way of a short message service (sms). The authentication code generation module 120 may further store the document for future use in the other data.

For the purpose of explanation and not as a limitation, it may be understood that the printing system 102 initiates a confidentiality determination phase upon receiving a document to be printed. The confidentiality determination phase may include determining whether the document is confidential and generating an authentication code, when the document is identified as confidential. The confidentiality determination phase may be followed by a printing phase.

The printing phase for printing the stored documents may be triggered when a print request is provided by one of the users connected to the network 108 through the user devices 104. Upon receiving a print request, the authentication module 122 may determine if the print request corresponds to a document that was marked as confidential in the confidentiality determination phase. In case it is determined that the document is not marked confidential, a print trigger is triggered. Referring to FIG. 1a, where the printing system 102 is provided in the computing device, the authentication module 122 may provide the print trigger to the printer. The printer on receiving such a print trigger may print the requested document. Alternately, in case the printing system 102 is provided in the printer, as illustrated in FIG. 1b, the authentication module 122 may provide the print trigger to a printing unit (not shown in the figures) of the printer 106.

However, upon receiving the print request, if the authentication module 122 determines that the print request corresponds to a document marked as confidential, the user may be requested to provide the authentication code associated with the document. Thus, the authentication module 122 prompts the user to provide the authentication code that was generated earlier and provided to the predefined set of users. In an example, the user may email the authentication code to the email id corresponding to the printing system 102. In another example, the user may provide the authentication on an input unit provided on the printer.

Based on the authentication code provided by the user, the authentication module 122 may ascertain whether the user is authorized to print the document. If it is determined that the authentication code is valid, the authentication module 122 provides a print trigger to print the document. Alternately, if it is determined that the authentication code is not valid, a notification is triggered. The notification may be provided to the user, a predefined set of authorized users, or both. The notification may be for example, an error message to the user and an alert to the predefined set of authorized users. In an example, the authentication module 122 may provide a threshold number of attempts to the user to provide a valid authentication code. In case the user is not able to provide the valid authentication code in the threshold number of attempts, the authentication module 122 may bar the user from printing any document or that particular document. Additionally, the authentication module 122 may also provide the alert to the predefined set of users. Thus, an unauthorized user may be prevented from printing a confidential document, thereby ensuring the security of the documents printed in a shared network environment.

The present subject matter may be understood with the help of an example. Consider a case where a user has five documents that are to be printed. The user may have soft copies of four documents and a hard copy of one document. Further, since the documents are to be provided to the printing system 102 for printing, the user may scan the fifth document. Further, the fifth document may be confidential, so the user may tag the document with a confidential code. For instance, the user may write "Protected" at the top of the fifth document and scan the document having the confidential code. In addition to the fifth document, one of the documents in the form of soft copies may be confidential. Consider that this document has a confidential code, "Secure Document", typewritten at the bottom of the document.

The printing system 102, upon receiving the five documents, may initiate a confidentiality determination phase and determine whether any of the received documents are confidential. For the ease of explanation, the confidentiality determination criterion is to check for presence of confidential codes, "Protected" and "Secure Document", at the top or at the bottom of a document. Based on the confidentiality determination criterion, it may be determined that two of the received documents are confidential and these two documents may be marked confidential. Further, an authentication code may be generated for each of the documents. It will be understood that a common authentication code may also be generated for both the documents. For example, in case the print job includes a set of documents then a common authentication code may be generated for the set. The received documents are stored so that they be accessed and printed in future.

In order to print the documents, the user may provide a request to print the documents. Upon receiving such a request, the printing system 102 may determine that two of the documents were marked confidential in the confidentiality determination phase. The printing system 102 may prompt the user to provide authentication code(s) for printing the documents that were marked confidential and for rest of the three documents a printer trigger may be generated. Based on the authentication code(s) provided by the user, a print trigger may be provided to print the two documents marked as confidential.

Figure 2:
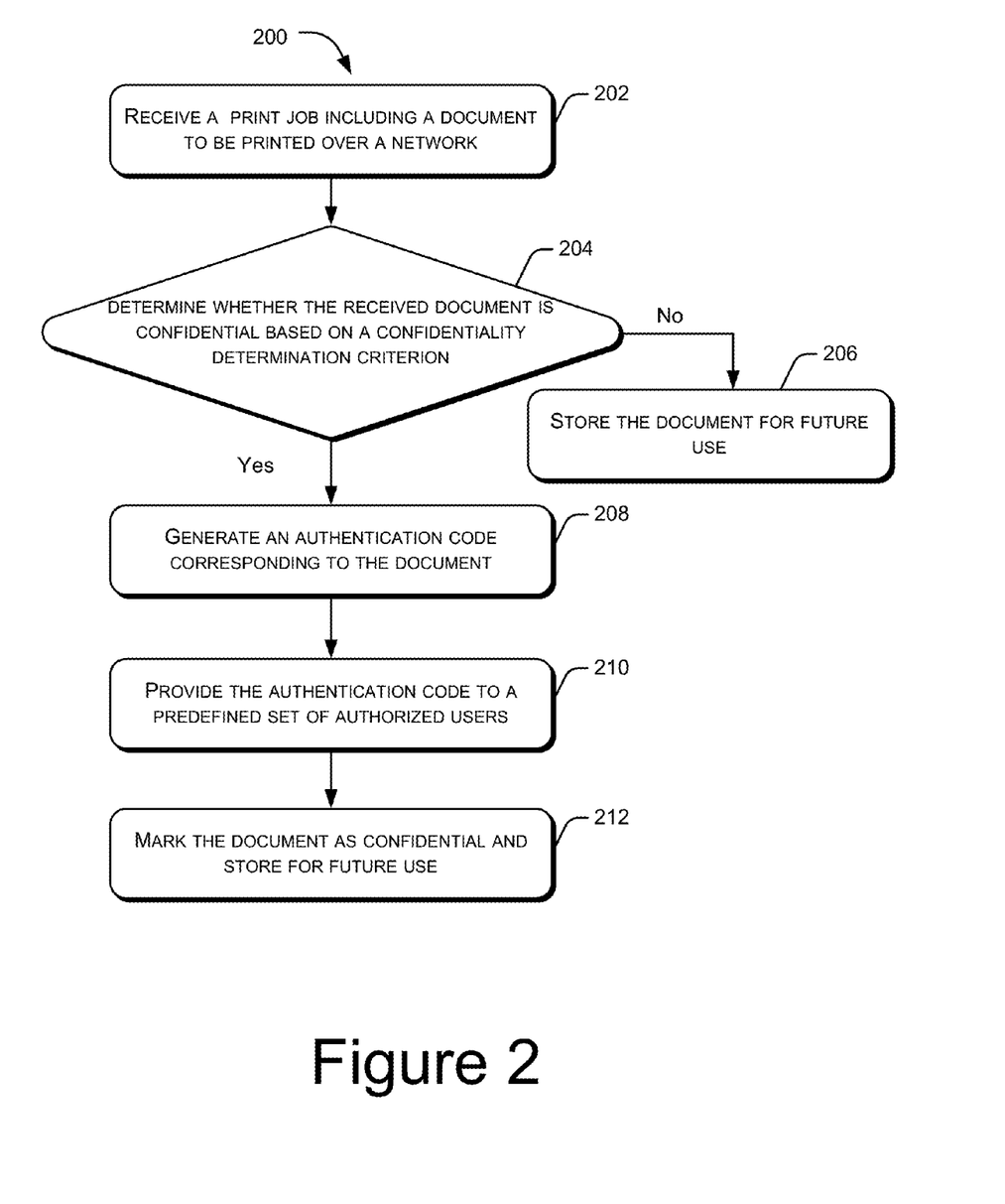
FIG. 2 illustrates a method for generation of authentication codes for printing a document over a network, according to an example of the present subject matter.
Figure 3:
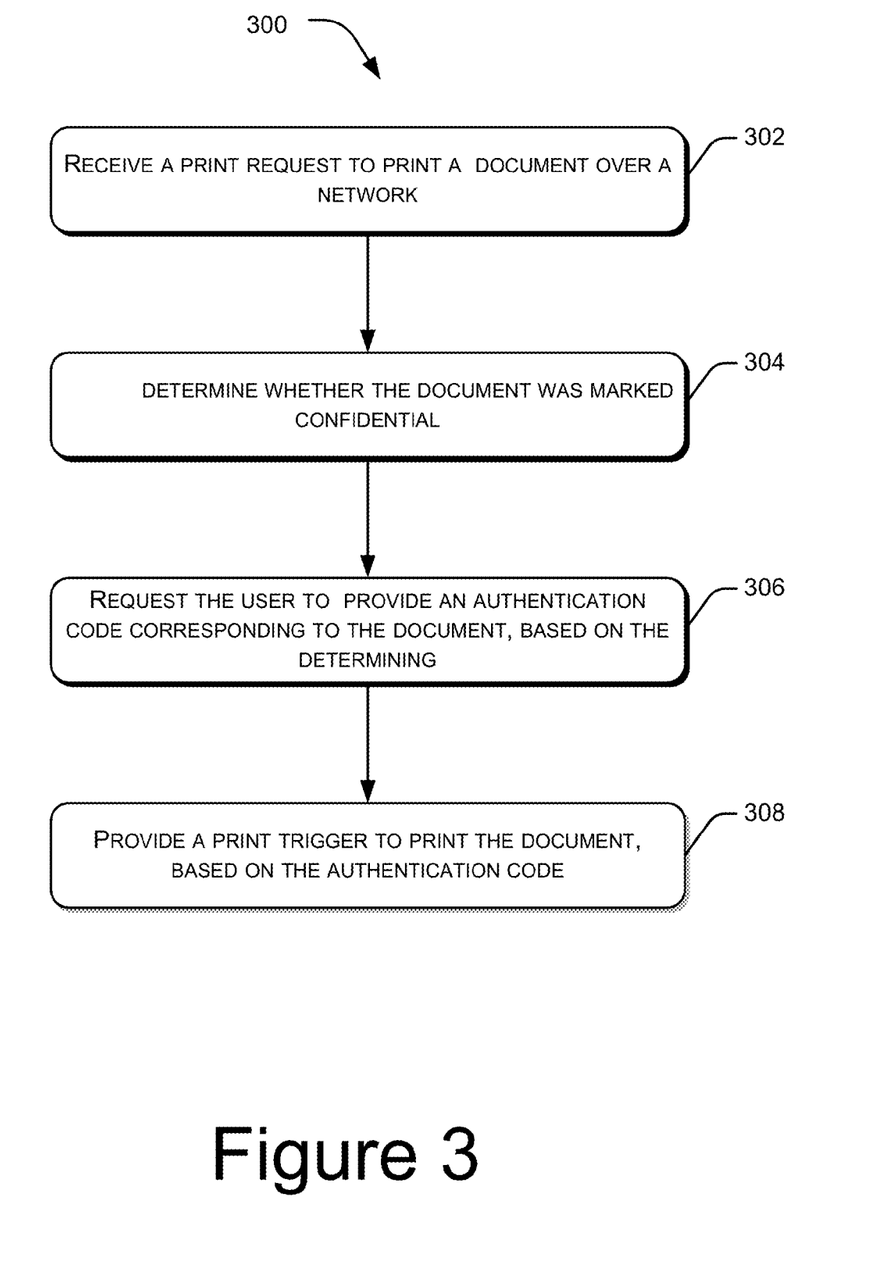
FIG. 3 illustrates a method for printing a document over a network, according to an example of the present subject matter.
Figure 4:
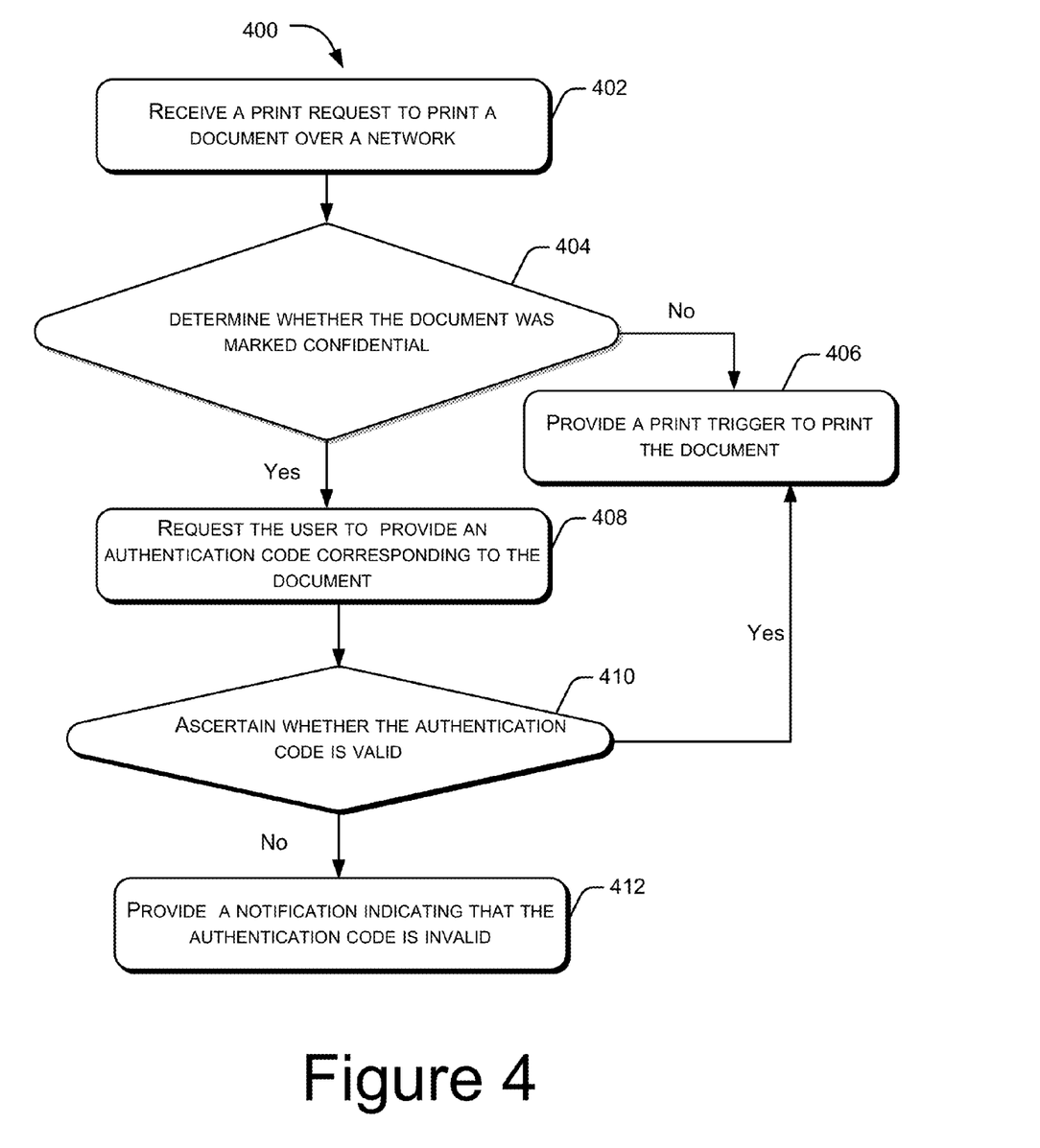
FIG. 4 illustrates a method for printing a document over a network, according to another example of the present subject matter.

Methods 200, 300 and 400 are described in FIG. 2, FIG. 3 and FIG. 4, respectively, for printing a document over a network, according to an embodiment of the present subject. The document may be printed in a shared printer environment, such as the shared printer environment 100.

The order in which the methods 200, 300, and 400 are described is not intended to be construed as a limitation, and any number of the described method blocks can be combined in any order to implement the methods 200, 300, and 400 or an alternative method. Additionally, individual blocks may be deleted from the method 200, 300, and 400 without departing from the spirit and scope of the subject matter described herein. Furthermore, the methods 200, 300, and 400 can be implemented in any suitable hardware, software, firmware, or combination thereof.

It would be understood that the methods 200, 300, and 400 can be performed by programmed computing devices, for example, based on instructions retrieved from non-transitory computer readable media. The computer readable media can include machine-executable or computer-executable instructions to perform whole or a part of the described method. The computer readable media may be, for example, digital memories, magnetic storage media, such as a magnetic disks and magnetic tapes, hard drives, or optically readable data storage media.

Referring to FIG. 2, the method 200 may be performed by an authentication code generation module, such as the authentication code generation module 120.

At block 202, a print job including a document to be printed over a network is received. The document is provided by a user through a corresponding user device coupled to a shared printer over the network. In an example, the document may be received through an email or a scan to cloud feature.

At block 204, it is determined whether the received document is confidential based on a confidentiality determination criterion. In an example, the confidentiality determination criterion may include checks for presence of confidential codes at one of the predefined locations in the document. The confidential codes may be a handwritten code or may already be included in the electronic document. If it is determined that the document is not confidential, the method 200 proceeds to ('No branch') block 206.

At block 206, the document is stored for future access, for example, for printing at a later stage.

Referring back to block 204, if it is determined that the document is confidential, the method 200 proceeds to ('Yes branch') block 208.

At block 208, an authentication code is generated to ensure confidentiality of the document. The authentication code may be generated using, for example, a random password generation technique. The authentication code is generated to provide access to print the document.

At block 210, the authentication code is provided to a predefined set of authorized users. The predefined set of users includes the user, who provided the print job, also referred to as a requestor. Thus, the predefined set of users is enabled to print the document. In an example, the authentication code may be provided by way of emails and SMSs.

At block 212, the document is marked confidential and stored for future use. Further, the authentication code generated may also be associated with the document so that when a print is requested for the document, authenticity of a user requesting the print may confirmed based on the authentication code.

FIG. 3 and FIG. 4 illustrate methods 300 and 400 to print a document, according to an example of the present subject matter. The methods 300 and 400 may be performed by an authentication module, such as the authentication module 122 of the printing system 102.

Referring to FIG. 3, at block 302 a print request to print a document is received from a user.

At block 304, it is determined whether the document was marked confidential. For example, it may be determined whether the document was marked confidential during a confidentiality determination phase.

At block 306, the user is requested to provide an authentication code corresponding to the document, based on the determining.

At block 308 based on the authentication code, a print trigger to print the document is provided.

Referring to FIG. 4, at block 402, a print request to print a document over a network. The print request may be provided by a user through a user device, such as the user device 104 connected to a printer over the network.

At block 404, it is determined whether the document was marked confidential. In an example, the method 200 is implemented to mark a document as confidential. Further, the document may be marked confidential during a confidentiality determination phase. If at block 404 it is determined that the document was not marked confidential, the method 400 proceeds to ('No branch') to block 406.

At block 406, a print trigger is provided to print the document. The printer, on receiving such a print trigger, prints the requested document.

However, if at block 404, it is determined that the document was marked confidential, the method 400 proceeds to ('Yes branch') to block 408.

At block 408, the user is requested to provide an authentication code corresponding to the document. In an example, the authentication code is requested to determine whether the user is authorized to print the document or not. Further, the user is requested to provide the authentication code that is generated and shared with the user during the confidentiality determination phase.

At block 410, it is ascertained whether the authentication code provided by the user is valid or not. If at block 410, it is determined that the authentication code is valid, the method 400 proceeds to ('Yes branch') to block 406, where the print trigger is provided to print the document.

However, if at block 410, it is determined that the authentication code is not valid, the method 400 proceeds to ('No branch') to block 412.

At block 412, a notification indicating that the authentication code is invalid, is provided. For example, the notification may indicate it to the user that the print request is discarded. In another example, the notification may alert authorized user(s) that an unauthorized attempt has been made to print the document. Thus, the notification may be provided to the user, the predefined set of authorized users, or both.

Figure 5:
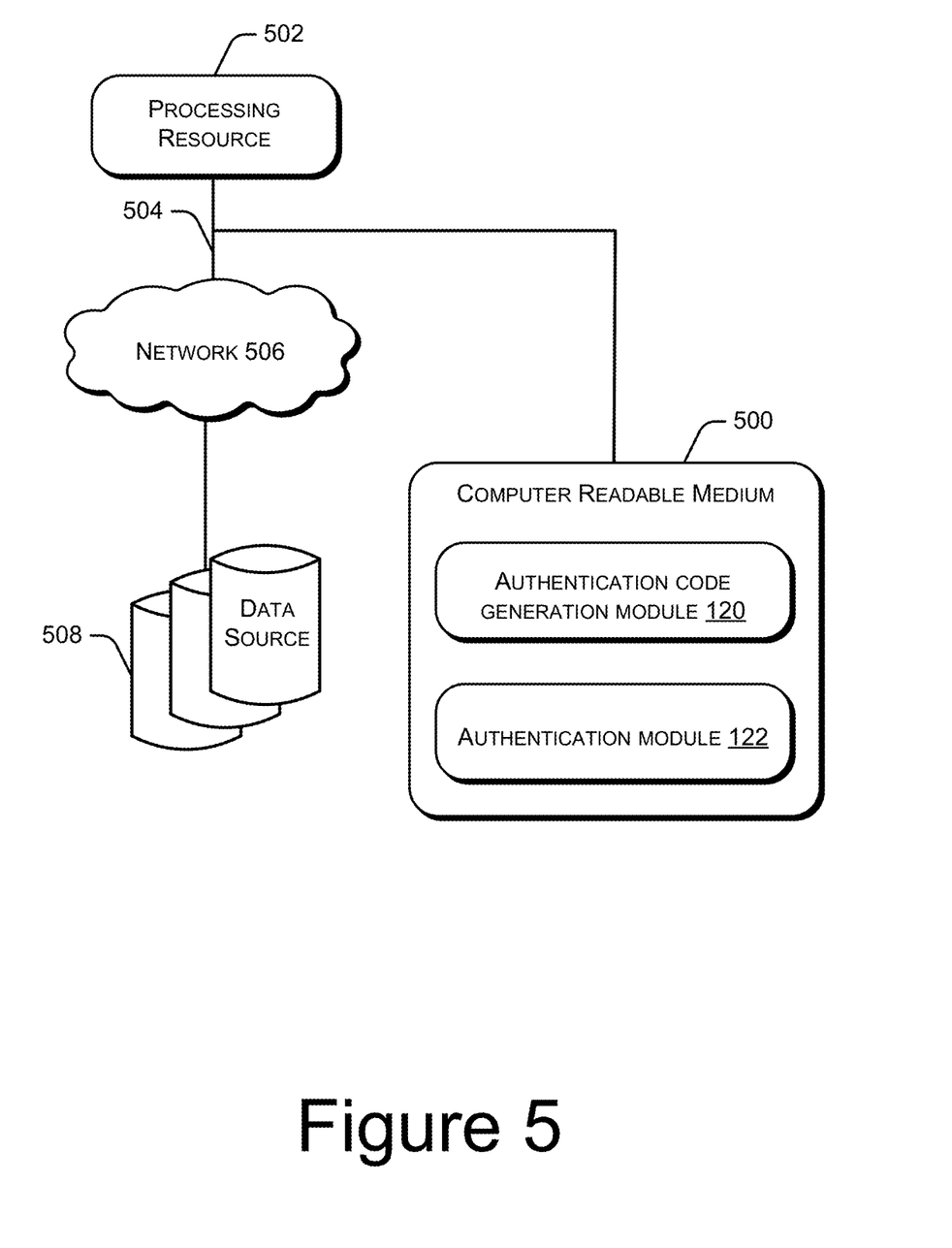
FIG. 5 illustrates a computer readable medium storing instructions for printing a document, according to an example of the present subject matter.

FIG. 5 illustrates a computer readable medium 500 storing instructions for printing a document, according to an example of the present subject matter. In one example, the computer readable medium 500 is communicatively coupled to a processing resource 502 over a communication link 504.

For example, the processing resource 502 can be a computing device, such as a server, a laptop, a desktop, a mobile device, and the like. The computer readable medium 500 can be, for example, an internal memory device or an external memory device or any commercially available non transitory computer readable medium. In one implementation, the communication link 504 may be a direct communication link, such as any memory read/write interface. In another implementation, the communication link 504 may be an indirect communication link, such as a network interface. In such a case, the processing resource 502 can access the computer readable medium 500 through a network 506. The network 506, like the network 108, may be a single network or a combination of multiple networks and may use a variety of different communication protocols.

The processing resource 502 and the computer readable medium 500 may also be communicatively coupled to data sources 508 over the network. The data sources 508 can include, for example, databases and computing devices. The data sources 508 may be used by the requesters and the agents to communicate with the processing unit 502.

In one implementation, the computer readable medium 500 includes a set of computer readable instructions, such as authentication code generation module 120 and the authentication module 122. The set of computer readable instructions can be accessed by the processing resource 502 through the communication link 504 and subsequently executed to perform acts for printing of electronic messages.

On execution by the processing resource 502, the authentication code generation module 120 receives a print job including the document to be printed. For the purpose of explanation, on receiving the print job, the authentication generation module 120 may initiate a confidentiality determination phase. In the confidentiality determination phase, the authentication code generation module 120 may determine whether the document includes a confidential code. The confidential code may be handwritten code or typewritten code. On determining that the document includes the confidential code, the document may be marked as confidential. Further, the authentication code generation module 120 may generate an authentication code corresponding to the document, when the document includes the confidential code. The authentication code may be provided to a predefined set of authorized users.

Further, the authentication module 122 may receive a print request from a user to print the document. On receiving the print request, it may be determined whether the document was marked confidential during the confidentiality determination phase. When it is determined that document was marked confidential, the user may be requested to provide the authentication code corresponding to the document. The authentication code may be verified to provide print control to the user and a print trigger may be generated when the authentication code is verified. Further, in case the authentication code is not verified or, in other words, it is ascertained that that the authentication code is invalid a notification indicating the same may be generated Although implementations for printing documents over a network have been described in language specific to structural features and/or methods, it is to be understood that the appended claims are not necessarily limited to the specific features or methods described. Rather, the specific features and methods are disclosed as example implementations for printing a document over a network.

I claim:

1. A printing system for printing documents over a network, the printing system comprising:
   a processor; and
   a memory storing machine readable instructions, which when executed by the processor cause the processor to:
   receive, from a user, a document including content to be printed;
   ascertain whether the document is confidential, based on a determination as to whether text indicating that the document is confidential is present in the content to be printed;
   in response to ascertaining that the document is confidential, generate an authentication code corresponding to the document to provide print control of the document to authorized users, wherein the authorized users includes the user, and wherein the authentication code is a code to ascertain that the authorized users are authorized to print the document; and
   provide the authentication code to the authorized users to provide the print control.

2. The printing system as claimed in claim 1, wherein the determination of whether text indicating that the document is confidential is present in the content to be printed includes a determination as to whether the text indicating that the document is confidential is located at at least one of a plurality of predefined locations in the document.

3. The printing system as claimed in claim 2, wherein the text indicating that the document is confidential includes a handwritten text in the content to be printed.

4. The printing system as claimed in claim 1, wherein the processor marks the document as confidential in response to ascertaining that the document is confidential.

5. The printing system as claimed in claim 1, wherein the machine readable instructions are further to cause the processor to:
  receive a print request from the user to print the document;
  determine whether the document was marked confidential;
  request the user to provide the authentication code corresponding to the document in response to a determination that the document was marked confidential; and
  generate a print trigger to print the document in response to receiving the authentication code from the user.

6. A method for printing a document over a network, the method comprising:
  receiving the document including content to be printed;
  determining whether the document is confidential, based on a determination as to whether text indicating that the document is confidential is present in the content to be printed;
  in response to a determination that the document is confidential, generating an authentication code corresponding to the document, wherein the authentication code is a code to be used by authorized users in a predefined group to verify that the authorized users are authorized to print the document;
  receiving a print request from a user to print the document;
  determining whether the document was marked confidential;
  requesting the user to provide an authentication code corresponding to the document in response to determining that the document was marked confidential; and
  providing a print trigger to print the document in response to receiving a valid authentication code from the user.

7. The method as claimed in claim 6 further comprising:
  ascertaining whether the authentication code provided by the user is valid; and
  providing a notification to the user in response to ascertaining that the authentication code provided by the user is not valid.

8. A non-transitory computer-readable medium having a set of computer readable instructions that, when executed, cause a printing system to:
  receive a document including content to be printed;
  determine whether the document is confidential, based on a determination as to whether a text indicating that the document is confidential is present in the document;
  in response to a determination that the document is confidential, generate an authentication code corresponding to the document, wherein the authentication code is a code to be used by authorized users in a predefined group to verify that the authorized users are authorized to print the document;
  receive a request to print the document from a user;
  determine whether a document was marked confidential;
  request the user to provide an authentication code corresponding to the document in response to a determination that the document was marked confidential;
  verify whether the authentication code provided by the user is valid; and
  generate a print trigger to print the document in response to a verification that the authentication code provided by the user is valid.

9. The non-transitory computer-readable medium as claimed in claim 8, wherein the instructions executed further cause the printing system to:
  provide the authentication code to the predefined group of authorized users.

10. The non-transitory computer-readable medium as claimed in claim 8, wherein the text indicating that the document is confidential is one of a handwritten code and a typewritten code.

11. The non-transitory computer-readable medium as claimed in claim 8, wherein the instructions executed further cause the printing system to generate a notification to the user in response to a verification that the authentication code provided by the user is invalid.

* * * * *